United States Patent
Sinha et al.

(10) Patent No.: US 11,886,964 B2
(45) Date of Patent: Jan. 30, 2024

(54) PROVISIONING INTERACTIVE CONTENT BASED ON PREDICTED USER-ENGAGEMENT LEVELS

(71) Applicant: Adobe Inc., San Jose, CA (US)

(72) Inventors: Atanu R. Sinha, Bangalore (IN); Xiang Chen, San Jose, CA (US); Sungchul Kim, San Jose, CA (US); Omar Rahman, San Jose, CA (US); Jean Bernard Hishamunda, San Jose, CA (US); Goutham Srivatsav Arra, Dublin, CA (US); Shiv Kumar Saini, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/322,108

(22) Filed: May 17, 2021

(65) Prior Publication Data

US 2022/0366299 A1    Nov. 17, 2022

(51) Int. Cl.
*G06N 20/00* (2019.01)
*G06F 3/0484* (2022.01)
*H04L 67/50* (2022.01)

(52) U.S. Cl.
CPC ........... *G06N 20/00* (2019.01); *G06F 3/0484* (2013.01); *H04L 67/535* (2022.05)

(58) Field of Classification Search
CPC ........ G06N 20/00; G06F 3/0484; H04L 67/22
See application file for complete search history.

(56) References Cited

U.S. PATENT DOCUMENTS

| 8,959,540 B1 * | 2/2015 | Gargi | H04N 21/44008 725/19 |
| 9,665,890 B1 * | 5/2017 | Kent | G06Q 30/0272 |
| 10,839,310 B2 * | 11/2020 | Coppin | G06N 7/005 |

(Continued)

OTHER PUBLICATIONS

Digital Sales & Analytics: Driving Above-Market Growth in B2B, Available Online at: https://www.mckinsey.com/business-functions/marketing-and-sales/our-insights/digital-sales-and-analytics-compendium#, May 2018, pp. 1-78.

(Continued)

*Primary Examiner* — Nhat Huy T Nguyen
(74) *Attorney, Agent, or Firm* — Kilpatrick Townsend & Stockton LLP

(57) ABSTRACT

Methods and systems disclosed herein relate generally to systems and methods for using a machine-learning model to predict user-engagement levels of users in response to presentation of future interactive content. A content provider system accesses a machine-learning model, which was trained using a training dataset including previous user-device actions performed by a plurality of users in response to previous interactive content. The content provider system receives user-activity data of a particular user and applies the machine-learning model to the user-activity data, in which the user-activity data includes user-device actions performed by the particular user in response to interactive content. The machine-learning model generates an output including a categorical value that represents a predicted user-engagement level of the particular user in response to a presentation of the future interactive content.

19 Claims, 12 Drawing Sheets

(56) References Cited

U.S. PATENT DOCUMENTS

| | | | |
|---|---|---|---|
| 2013/0174045 A1* | 7/2013 | Sarukkai | G06Q 30/0255 715/744 |
| 2015/0120753 A1* | 4/2015 | Wang | G06Q 50/01 707/746 |
| 2020/0186846 A1* | 6/2020 | Mishra | H04N 21/25891 |

OTHER PUBLICATIONS

Benhaddou et al., Customer Relationship Management and Small Data—Application of Bayesian Network Elicitation Techniques for Building a Lead Scoring Model, IEEE/ACS 14th International Conference on Computer Systems and Applications (AICCSA), 2017, 6 pages.

Huang et al., Online Purchase Prediction Via Multi-Scale Modeling of Behavior Dynamics, Proceedings of the 25th ACM SIGKDD International Conference on Knowledge Discovery & Data Mining, 2019, pp. 2613-2622.

McCraw, What is Predictive Lead Scoring: Features, Benefits, Top Tools, GETVOIP, Cloud Communication Advisor, Available Online at: https://getvoip.com/blog/2020/09/01/predictive-lead-scoring/, Sep. 1, 2020, pp. 1-12.

Ramanujam, Machine Learning Driven Sales and Marketing for Everyone With Einstein Behavior Scoring (Part 1), Available Online at: https://engineering.salesforce.com/machine-learning-driven-sales-and-marketing-for-everyone-with-einstein-behavior-scoring-part-1-afdb76a5a480, Feb. 11, 2020, pp. 1-14.

Ramanujam, Machine Learning Driven Sales and Marketing for Everyone With Einstein Behavior Scoring (Part 2), Available Online at: https://engineering.salesforce.com/machine-learning-driven-sales-and-marketing-for-everyone-with-einstein-behavior-scoring-part-2-ac3cb3caf942, Feb. 13, 2020, pp. 1-13.

Rubin et al., Estimating the Causal Effects of Marketing Interventions Using Propensity Score Methodology, Statistical Science, vol. 21, No. 2, 2006, pp. 206-222.

\* cited by examiner

| lead_person_id | campaign_id | mktg_asset_id | activity_type_id | revenue_model_name | old_stage | new_stage | updated_at |
|---|---|---|---|---|---|---|---|
| ###7#### | | 1426 | 2 | Prospect Lifecycle | Known | Known | 4/10/2019 3:29 |
| ###7#### | 1099 | 6131 | 104 | Prospect Lifecycle | Known | Known | 4/10/2019 3:29 |
| ###7#### | 20628 | 1037 | 104 | Prospect Lifecycle | Known | Inquiry | 4/10/2019 3:30 |
| ###7#### | | | 46 | Prospect Lifecycle | Known | Inquiry | 4/10/2019 3:30 |
| ###7#### | 22351 | 1426 | 2 | Prospect Lifecycle | Known | Unknown | 4/10/2019 3:38 |
| ###7#### | | 6131 | 104 | Prospect Lifecycle | Known | Unknown | 4/10/2019 3:38 |
| ###7#### | 2940 | | 46 | Prospect Lifecycle | AQL | Disqualified | 4/10/2019 3:38 |
| ###7#### | 6348 | 3549 | 104 | Prospect Lifecycle | Known | Unknown | 4/10/2019 3:50 |
| ###7#### | | 99662 | 23 | Prospect Lifecycle | Known | Unknown | 4/10/2019 3:53 |
| ###7#### | | 8211 | 42 | Prospect Lifecycle | Known | Inquiry | 4/10/2019 3:53 |
| ###7#### | 19467 | 100784 | 23 | Prospect Lifecycle | Known | Inquiry | 4/10/2019 9:00 |

FIG. 5

PROVISIONING INTERACTIVE CONTENT BASED ON PREDICTED USER-ENGAGEMENT LEVELS

TECHNICAL FIELD

This disclosure relates generally to methods of using machine-learning models to predict engagement levels of a user in response to presentation of future interactive content. More specifically, but not by way of limitation, this disclosure relates to systems and methods for using a machine-learning model to generate a categorical value that represents a predicted user-engagement level of a particular user in response to the presentation of the future interactive content.

BACKGROUND

Content provider systems use various techniques to predict how a particular user would react in response to presentation of interactive content, such that the content provider systems can determine whether future resources (e.g., interactive content, user-customized service) should be allocated so as to convert the particular user to obtain products and services provided by the content provider system. One exemplary technique includes classifying the user into one of various stages, in which a later stage indicates a higher likelihood that: (i) the user would interact with a particular type of a follow-up interactive content; and/or (ii) the user will engage with future resources provided by the content provider systems. In this example, each stage acts as a guidepost on which types actions the content provider system can perform. Further, accurately associating the user with a particular stage facilitates the content provider system to predict whether and when the user is likely to engage with the future resources allocated by the content provider systems, and/or to select future resources that can be most effective for converting the user to obtain the products and services provided by the content provider system.

It would be advantageous for the content provider system to identify different types of user-device actions that would be predictive of a particular stage to which the user should be assigned and/or indicate a transition from a current stage to a later stage, thereby allowing the content provider system to promptly provide the follow-up interactive content to increase the user's engagement levels. Even more, it would be advantageous for the content provider system to accurately predict whether the user will engage with the follow-up interactive content at a future time point for efficient use of available content resources. To perform these tasks, conventional techniques typically rely on rule-based scoring system, in which information about the user (e.g., role of the user in an entity) and the user behavior can be scored. The rules are typically derived from human heuristics, in which a particular type of information (e.g., a CIO user) is weighted higher than other types of information (e.g., a consultant user). The score is then used to determine whether the follow-up interactive content should be presented to the user. Predicting user engagement levels with future resources using these conventional techniques is challenging since the rules cannot be dynamically changed based on ever-changing user behavior across different time periods.

Other conventional techniques include using machine-learning models to predict user-engagement levels to future interactive content presented by the content provider system. Implementing conventional machine-learning techniques, however, are technically challenging, because interpreting a user-device action can depend on various factors including when the user-device action was performed relative to other user-device actions that were previously performed. Further, within the context of user-engagement prediction, a number of positive samples are substantially less than a number of negative samples. The conventional machine-learning techniques thus face a technical challenge of creating an empirical design for training the machine-learning model to perform accurately, when such class imbalance problems exist. As a result, conventional machine-learning techniques for predicting user-engagement levels suffer from low accuracy levels.

SUMMARY

Certain embodiments include a content provider system that uses a machine-learning model to predict user-engagement levels of a user in response to presentation of future interactive content. The content provider system accesses a machine-learning model configured to generate a categorical value that represents a predicted user-engagement level in response to presentation of future interactive content. The machine-learning model is trained using a training dataset including previous user-device actions performed by a plurality of users in response to previous interactive content. The machine-learning model is trained by identifying a set of time windows and generating a score for training data associated with each time window.

The content provider system receives user-activity data of a particular user and applies the machine-learning model to the user-activity data. In some instances, the user-activity data includes user-device actions performed by the particular user in response to another interactive content. The trained machine-learning model generates a categorical value that represents a predicted user-engagement level of the particular user in response to presentation of future interactive content. The content provider system selects a follow-up interactive content that is associated with the generated categorical value.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 5 shows an example of an activity log used for training a machine-learning model, according to some embodiments.

DETAILED DESCRIPTION

Figure 1:
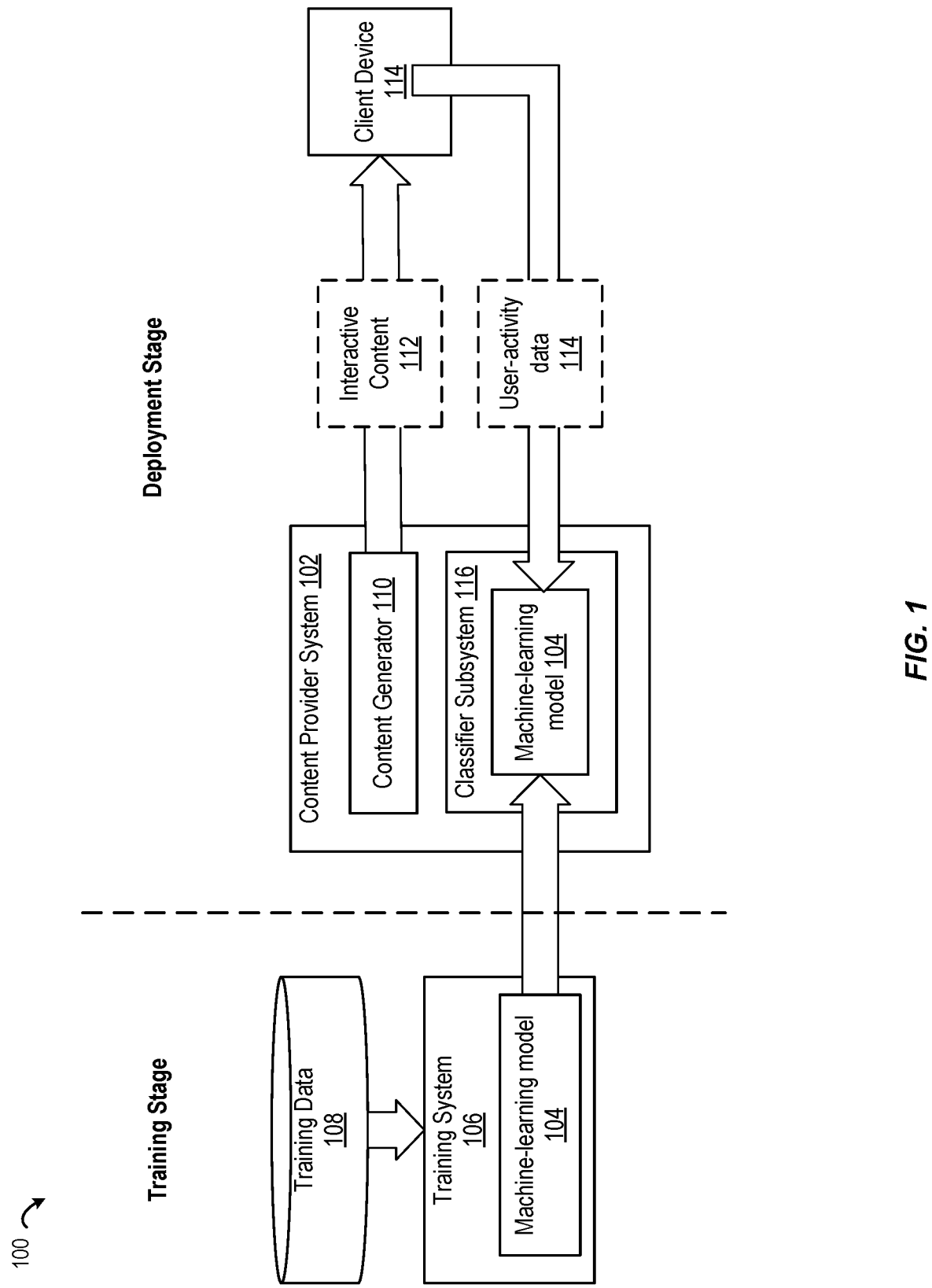
FIG. 1 illustrates an example of a computing environment for provisioning interactive content based on predicted user-engagement levels, according to some embodiments.

Certain embodiments described herein can address one or more of the problems identified above by using a time window based training to enable a machine-learning model to predict or classify user-engagement levels of a user in response to presentation of future interactive content. A content provider system accesses a machine-learning model. The machine-learning model is configured to predict user-engagement levels of users in response to presentation of future interactive content. The predicted user-engagement levels of a user indicates a likelihood of whether a user will respond to and engage with different types of future interactive content, so as to determine whether a follow-up interactive content should be generated for a particular user. In some instances, the machine-learning model was trained using a training dataset that includes previous user-device actions performed in response to presentation of previous interactive content. In an illustrative example, the content provider system transmits a message with a set of images to a plurality of users. From each user, the content provider system collects data indicating whether a corresponding user device of the user interacted with the message by opening the message and accessing a hyperlink embedded in one of the set of images. The data also includes a timestamp identifying when the image was accessed by the user. The content provider system then generates a training dataset that includes the data collected from the plurality of users.

The machine-learning model was trained by identifying a time period within which the previous user-device actions were performed. Continuing with this example, the earliest timestamp and the last timestamp of user-device actions identified from the training dataset are selected, and the timestamps are used to determine that the time period for training the machine-learning model is three months. After the time period is identified, the time period is split into a set of time windows. For example, the 3-month time period can be split into a set of time windows, each of which spanning 7 days. Then, for each time window of the set of time windows, the machine-learning model is trained using a subset of the training dataset that includes previous user-device actions identified as being performed within the time window. The machine-learning model, based on the training data that includes previous user-device actions, can thus be trained to generate the categorical value (e.g., a particular stage of a set of funnel stages) that represents a predicted user-engagement level of the particular user in response to presentation of future interactive content.

The content provider system receives user-activity data of a particular user. The user-activity data includes one or more user-device actions performed by the particular user in response to another interactive content. Continuing with this example, the content provider system transmits a video content and a hyperlink for accessing a website. The content provider system receives user-activity data of a particular user, in which the user-activity data includes a first user-device action indicating the user viewing the video content at a first time point and a second user-device action indicating the user creating, at a second time point, a user account in the website by accessing the hyperlink.

The content provider system then applies the machine-learning model to the user-activity data to generate an output including a categorical value that represents a predicted user-engagement level of the particular user in response to presentation of future interactive content. Continuing with this example, the content provider system applies the machine-learning model to the user-activity data that includes the first and second user-device actions, and the categorical value (e.g., a stage) of the generated output indicates that the particular user is likely to engage (e.g., click, sending a response message indicating an interest to purchase the monthly subscription, interact with web page presenting the follow-up content) with a particular set of interactive content are associated with the categorical value, such as an email recommending a monthly subscription of a software service.

The content provider system selects a follow-up interactive content that is associated with the categorical value of the generated output and causes, based on the generated output, transmission of the follow-up interactive content to a user device of the particular user, such that the user device displays the follow-up interactive content. Continuing with this example, the content provider system transmits one or more programmable instructions that causes a browser of the user device to display the follow-up content as a pop-up window. In some instances, the follow-up interactive content is a targeted interactive content generated specifically for the particular user.

Certain embodiments described herein provide an improved machine-learning techniques for generating prediction of user-engagement levels, in which training configurations of the machine-learning model can be dynamically adjusted by the training system. For example, a size of each time window can be adjusted during the training phase, which facilitates training of the machine-learning model based on different subsets of the training data identified within previous time windows. Allowing the user to specify the size of the time window during training can reduce: (i) the risk of training the machine-learning model on data that is no longer relevant; (ii) the risk of building an under-fit machine-learning model. Further, the time windows can be used to perform periodic training and validation of the machine-learning model, such that additional collected data can be used to fine-tune the accuracy of the machine-learning model.

The above advantages facilitate immediate usage of the machine-learning model upon deployment but with opportunities for continual update with new data. Moreover, certain embodiments described herein address a challenge of predicting user-engagement levels over a particular future time point or interval (e.g., user-engagement level for a particular future time window), instead of predicting user-engagement levels for an unbounded time window.

Computing Environment for Provisioning Interactive Content Based on Predicted User-Engagement Levels FIG. 1 illustrates an example of a computing environment 100 for provisioning interactive content based on predicted user-engagement levels, according to some embodiments. The computing environment 100 includes a content provider system 102. In some instances, the content provider system 102 can include one or more servers configured to provide interactive content to users. In some instances, the content provider system 102 is associated with one or more various types of entities, including content providers, publishers, and digital marketers. For example, a content provider initiates a campaign that distributes interactive content to a plurality of users.

The content provider detects and collects user-device actions performed by the users and applies a machine-learning model to the user-device actions to predict whether, for each user of the plurality of users, the user will achieve "opportunity" stage at a future time point from when the respective user-device action(s) were performed (for example). The content provider identifies a subset of the plurality of users that are predicted to achieve the "opportunity" stage and transmits a targeted campaign for the subset of users. Such approach increases the likelihood that the users will engage in additional activities after receiving the targeted campaign. The machine-learning model is implemented through various phases and workflows, including a training phase for training the machine-learning model with training dataset and a deployment phase for using the trained machine-learning model to predict the "opportunity" stage.

(a) Training Phase

To enable the machine-learning model to generate the categorical value, the machine-learning model 104 is trained by a training system 106 using training datasets 108. The training system 106 can be any type of a machine-learning platform that includes services and tools for automating and accelerating delivery lifecycle of predictive applications (e.g., classifiers) that use machine-learning models. The training datasets 108 include time-stamped user-device activities for a set of users, in which each activity identifies a type of previous user-device action performed in response to presentation of previous interactive content. Once the machine-learning model 104 is trained, the training system 106 can deploy the machine-learning model 104 for access by the content provider system 102. In some instances, the training system 106 deploys the machine-learning model 104 by providing a copy of the machine-learning model 104 to the content provider system 102. Additionally or alternatively, the training system 106 deploys the machine-learning model 104 by executing and outputting the categorical value based on input data (e.g., user-activity data) transmitted by the content provider system 102 via a communication network.

(b) Deployment Phase

For the deployment phase, the content provider system 102 uses a content generator 110 that generates and transmits interactive content 112 to a client device 114. The interactive content 112 includes a document or audiovisual image designed to be presented on a display of the client device 114 in (e.g., in response to opening a marketing content). For example, the interactive content 112 is a brochure, a white paper, or a guide on a product or service may be presented to the client device 114. In some instances, the interactive content 112 is presented in forms of multi-media, graphics, images, videos, text, audio, links (e.g., hyperlinks), headings, tables, or graphs.

In response to transmitting the interactive content 112, the content provider system receives user-activity data 118 from the client device 114. The user-activity data 118 refers to one or more user-device actions performed by the client device 114 that are generated in response to presentation of the interactive content 112. The one or more user-device actions can be contextual to the interactive content that was presented. For example, a user-device action includes opening and responding to the interactive content, the user highlighting/commenting/annotating a specific area of the interactive content, sharing the interactive content with other users, reading part of the interactive content at a certain speed, clicking a hyperlink within the interactive content, zooming in on an image within the interactive content, searching for a certain term within the interactive content, selecting a table of contents item within the interactive content, spending a certain amount of time on a section or image within the interactive content, interacting with a multimedia element within the interactive content, revisiting a page of the interactive content a certain number of times, or copying part of the interactive content.

The content provider system 102 also includes a classifier subsystem 116 that applies the trained machine-learning model 104 to user-activity data 118 provided by the client device 114 so as to predict whether a user associated with the client device 114 will engage with a particular type of future interactive content. In particular, the machine-learning model 104 generates an output that includes a categorical value that represents a predicted user-engagement level of the particular user in response to a presentation of the future interactive content. In some instances, the categorical value includes a category of a set of predefined categories that identifies the predicted user-engagement level of the particular user. For example, the predefined categories include a prospect stage, a marketing-qualified lead (MQL) stage, a sales-qualified lead (SQL) stage, and an opportunity stage. Additionally or alternatively, the output includes a quantitative value (e.g., an inference score 318 of FIG. 3) that estimates a degree of the predicted user-engagement level of the particular user. In some embodiments, the categorical value represents the predicted user-engagement level of the particular user at a particular future time point or interval.

The content provider system 102 uses the output to select a follow-up interactive content, at which the content generator 110 transmits the follow-up interactive content to the client device 114. In effect, the trained machine-learning model 104 facilitates increased user-engagement levels of the user by selecting the appropriate follow-up interactive content at a particular time point.

Figure 2:
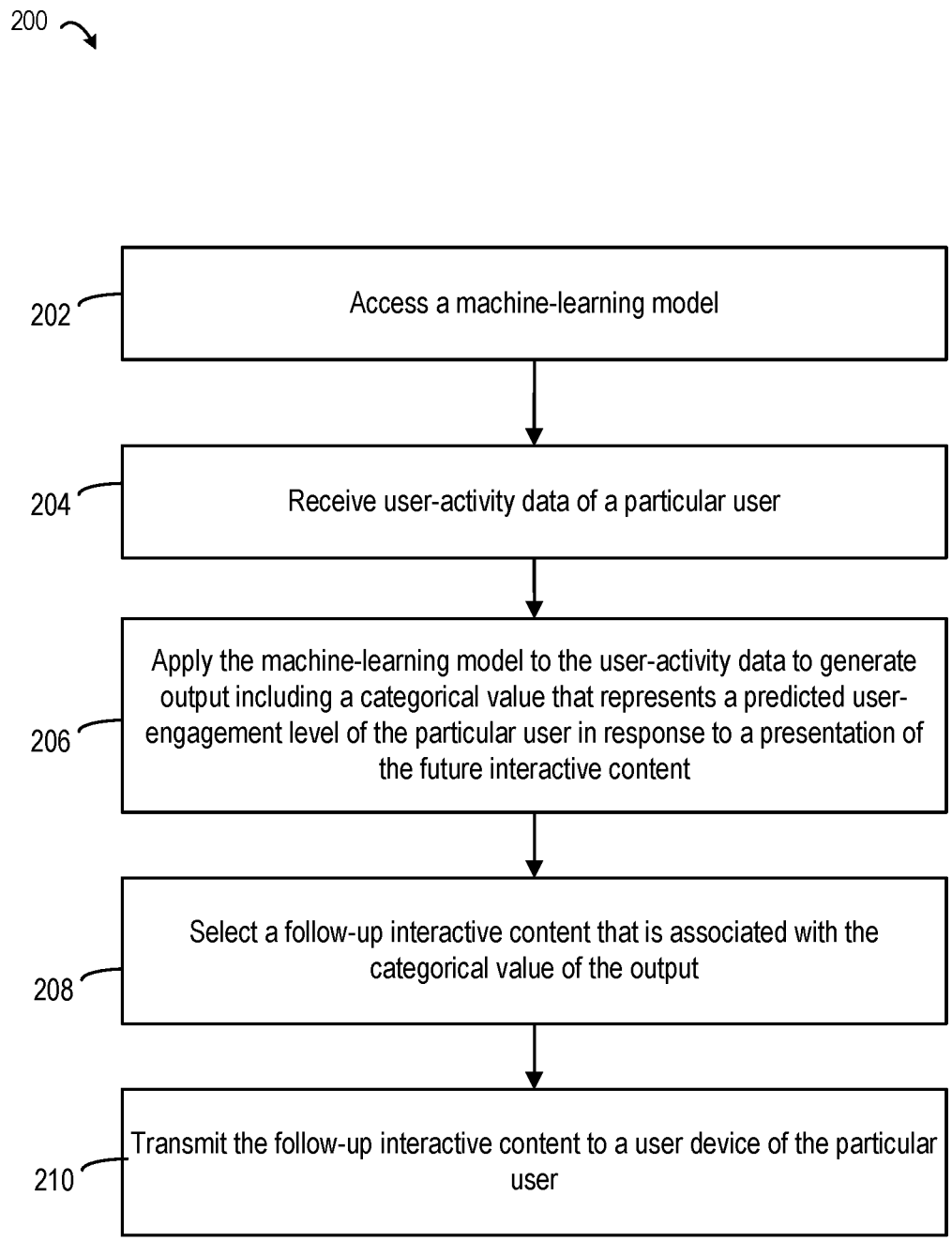
FIG. 2 illustrates a process for provisioning interactive content based on predicted user-engagement levels, according to some embodiments.

Process for Provisioning Interactive Content Based on Predicted User-Engagement Levels FIG. 2 illustrates a process 200 for provisioning interactive content based on predicted user-engagement levels, according to some embodiments. For illustrative purposes, the process 200 is described with reference to the components illustrated in FIG. 1, though other implementations are possible. For example, the program code for a content provider system 102 of FIG. 1, which is stored in a non-transitory computer-readable medium, is executed by one or more processing devices to cause a server system to perform one or more operations described herein.

At step 202, a content provider system accesses a machine-learning model. The machine-learning model is configured to generate a categorical value that represents a predicted user-engagement level of user in response to presentation of future interactive content. The predicted categorical value is used to select a particular follow-up interactive content for a user. In some instances, the machine-learning model is a gradient boosting algorithm.

In some instances, the machine-learning model was trained using a training dataset that includes previous user-device actions performed in response to presentation of previous interactive content. The machine-learning model was trained at least by: identifying a time period within which the previous user-device actions were performed; splitting the time period into a set of time windows; and training, for each time window of the set of time windows, the machine-learning model using a subset of the training dataset. In some instances, the subset of the training dataset includes previous user-device actions identified as being performed within the time window. The time period may include a first subperiod for the training phase and a second subperiod for validation phase.

In some instances, the training of the machine-learning model using the subset of the training dataset includes identifying a first previous user-device action of the subset performed by a previous user during a first time point of the time window and a second previous user-device action of the subset performed by the previous user during a later time point of the time window. The machine-learning model is then applied to the first and second previous user-device actions to generate another output including a categorical value that represents a predicted user-engagement level of the previous user in response to the presentation of the future interactive content. Such predicted output is compared with a target label associated with the second previous user-device action, in which the target label includes a target categorical value that identifies a known user-engagement level of the previous user. Depending on the comparison, one or more hyperparameters associated with the machine-learning model can be adjusted.

At step 204, the content provider system receives user-activity data of a particular user. The user-activity data includes one or more user-device actions performed by the particular user in response to another interactive content. For example, the one or more user-device actions performed by the particular user include accessing one or more hyperlinks embedded in the other interactive content and/or generating another file in response to presentation of the other interactive content. In some instances, the user-activity data further includes one or more actions performed by the content provider system in response to analyzing the user-device actions.

At step 206, the content provider system then applies the machine-learning model to the user-activity data to generate an output including a categorical value that represents a predicted user-engagement level of the particular user in response to a presentation of the future interactive content. In some instances, the categorical value includes a category of a set of predefined categories that identifies the predicted user-engagement level of the particular user. For example, the predefined categories include a prospect stage, a marketing-qualified lead (MQL) stage, a sales-qualified lead (SQL) stage, and an opportunity stage. Additionally or alternatively, the output includes a quantitative value (e.g., an inference score 318 of FIG. 3) that estimates a degree of the predicted user-engagement level of the particular user.

At step 208, the content provider system selects a follow-up interactive content that is associated with the categorical value of the output. For example, the follow-up interactive content for a categorical value predicting high-engagement level includes a targeted set of messages by content provider system to entice the particular user to perform one or more actions targeted by the content provider system. In another example, the follow-up interactive content for a categorical value predicting low-engagement level includes an audio-visual content that introduce one or more services provided by the content provider system. Additionally or alternatively, the content provider system does not perform any operation based on the categorical value. For example, the content provider system does not perform any operation in response to determining that the categorical value is predictive of a very-low engagement level by the user.

At step 210, the content provider system transmits the follow-up interactive content to a user device of the particular user, such that the user device displays the follow-up interactive content. In some instances, the follow-up interactive content is a targeted interactive content generated specifically for the particular user. Process 300 terminates thereafter.

Figure 3:
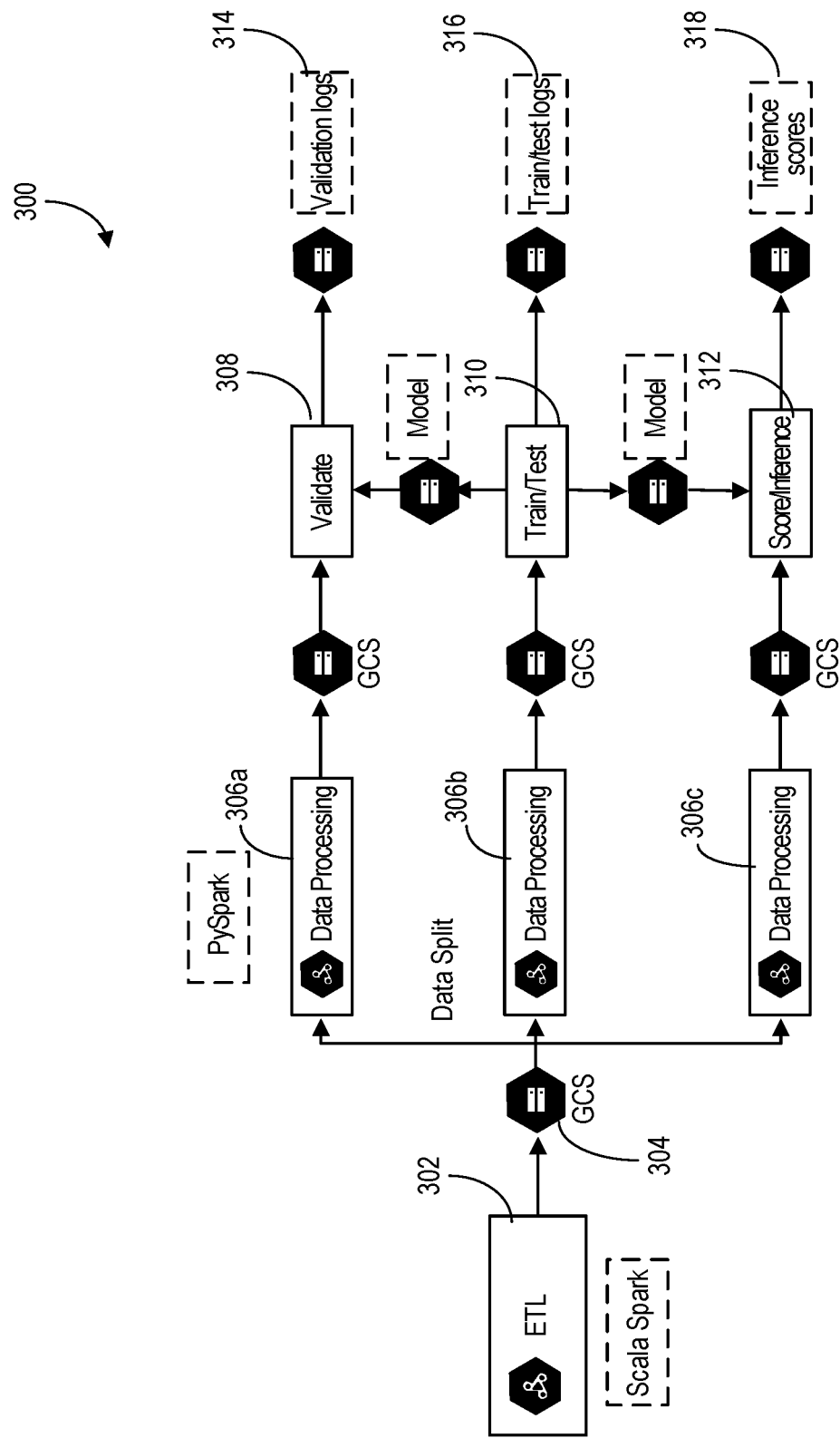
FIG. 3 illustrates an example of a schematic diagram for training and deploying a machine-learning model for provisioning interactive content based on predicted user-engagement levels, according to some embodiments.

Schematic Diagram for Implementing
Machine-Learning Model for Provisioning
Interactive Content Based on Predicted
User-Engagement Levels FIG. 3 illustrates an example of a schematic diagram 300 for training and deploying a machine-learning model for provisioning interactive content based on predicted user-engagement levels, according to some embodiments. For illustrative purposes, the schematic diagram 300 is described with reference to the components illustrated in FIG. 1, though other implementations are possible. For example, the program code for a content provider system 102 of FIG. 1, which is stored in a non-transitory computer-readable medium, is executed by one or more processing devices to cause a server system to perform one or more operations to generate scores predictive of user-engagement levels.

The schematic diagram 300 includes an extract, transform, load (ETL) component 302. The ETL component is configured to copy raw data from one or more sources into a destination system (e.g., a storage component 304), such that the destination system represents the raw data differently from the source(s) or in a different context than the source(s). In some instances, the ETL component 302 extracts the raw data from homogeneous or heterogeneous sources, transforms the raw data by cleaning and transforming them into a proper storage format/structure for the purposes of querying and analysis, and loading the transformed data a final target database such as an operational data store. In this instance, the ETL component 302 loads the transformed data in the storage component 304, which may communicate and provide access of the loaded data to other systems including the training system, the content provider system, and/or any other data processing systems.

Data processing components 306a-c access the loaded data stored in the storage component 304. In some instances, the loaded data are split into three different datasets, and each of data processing components 306a-c access one of the split datasets. In some instances, the loaded data are split in a predefined ratio, including 70% train, 15% validation, and 15% test split ratio. Other predefined ratios can be contemplated and implemented by a skilled person in the art, such as an 80% train, 10% validation, and 10% test split ratio. The data processing components 306a-c then process the respective dataset to generate input datasets.

Each of the input datasets is used to train, validate, and/or implement the machine-learning model. For example, a first input dataset generated by the data processing component 306a is used to validate a trained machine-learning model 308, a second input dataset generated by the data processing component 306b is used to train the machine-learning model 310, and a third input dataset generated by the data processing component 306c is used by the trained machine-learning model to predict the user-engagement level 312. In some instances, the operations for training, validating, and deploying the machine-learning model are performed in a particular sequence. For example, the training 310 of the machine-learning model is performed, at which the trained model is provided for the validation 308 and the prediction 312.

In addition to training and validating the machine-learning model, additional output data can be generated during the training 310, the validation 308, and/or the implementation 312 of the machine-learning model. The training 310 of the input dataset (e.g., a training dataset) can generate a training log 316, the validation 308 of the trained machine-learning model can generate a validation log 314, and the prediction 312 of the trained machine-learning model can generate one or more inference scores 318. The inference scores 318 can be used to generate a categorical value that represents a predicted user-engagement level of a user in response to presentation of future interactive content.

Figure 4:
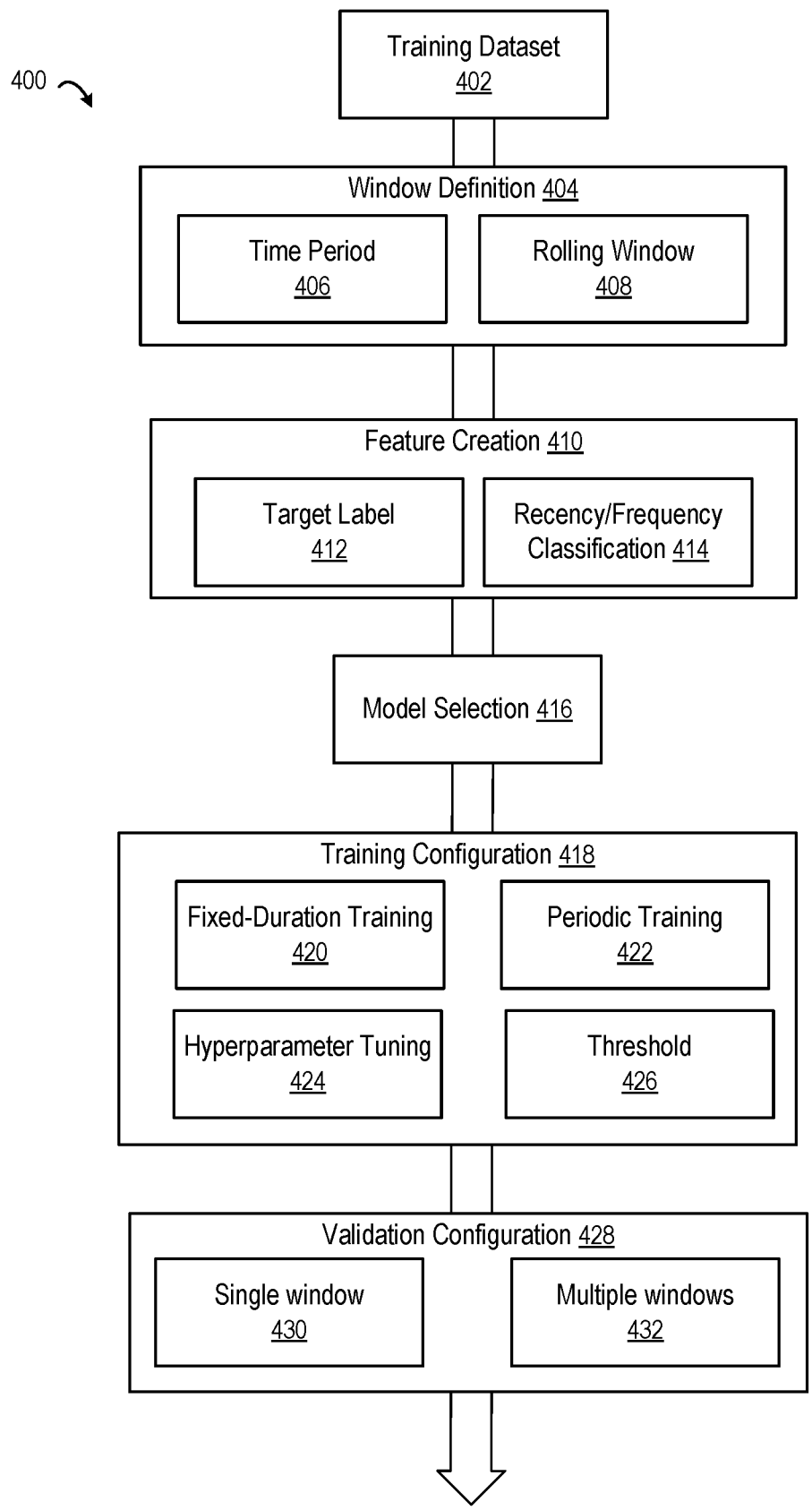
FIG. 4 illustrates an example of a training process for training a machine-learning model for provisioning interactive content based on predicted user-engagement levels, according to some embodiments.

Training Process for Provisioning Interactive Content Based on Predicted User-Engagement Levels (a) Overview FIG. 4 illustrates an example of a training process 400 for training a machine-learning model for provisioning interactive content based on predicted user-engagement levels, according to some embodiments. The training process 400 includes accessing a training dataset 402. A machine-learning model is trained using the training dataset 402, such that the machine-learning model is used to generate a categorical value that represents a predicted user-engagement level of a user in response to presentation of future interactive content. In some instances, the training dataset 402 includes previous user-device actions performed by respective users. The previous user-device actions were performed in response to a presentation of previous interactive content to the respective users. In some instances, the previous user-device action is recorded by the content provider system in response to a user-device action performed by the user.

The training dataset 402 includes a plurality of training data elements. Each data element of the plurality of training data elements includes an identifier of a user, a type of previous user-device action, and a time point when the previous user-device action was performed. In some instances, the type of previous user-device action identifies a user-device action performed in response receiving the previous interactive content. For example, the type of user-device includes opening an email, sending an email, generating a task, changing a user to another user, and requesting of additional information.

The training process 400 also includes performing a window definition 404. The window definition 404 includes defining a time period 406 and rolling time windows 408 within the time period 406. The time period 406 identifies a range of time (e.g., 1 year, 3 months) covered during the training of the machine-learning model. In some instances, the time period 406 is defined in units of days, months, or years.

The window definition 404 also includes defining rolling time windows 408 within the time period 406. In particular, the time period 406 is divided into a set of rolling time windows 408. Each of the rolling time windows 408 defines a time range within the time period 406. The time range of the rolling time window can be configured by the training system, such that the machine-learning model trained using multiple rolling time windows produces more reliable (less sensitive to time) results than training the machine-learning model using single time window. In some instances, a rolling time window further identifies an ordinal position of the time window (e.g., t_0+w, t_0+2w) relative to positions of other rolling time windows. For example, a first rolling time window identifies a third position within a set of rolling time windows, and a second rolling time identifies a seventh position within the same set of rolling time windows.

The training process also includes performing feature creation 410, which facilitates transformation of raw data into a set of features that better represent the underlying problem to the predictive models, resulting in improved model accuracy on unseen data. The feature creation 410 includes defining a target label 412. The target label 412 includes a categorical value that represents a known user-engagement level of the user associated with training data. For example, the target label 412 includes a categorical value of "opportunity" stage, which indicates that a previous user has converted a lead stage to an opportunity stage. In some instances, the feature creation 410 also includes generating recency and frequency classifications 414 for each of the previous user-device actions in the training dataset 402. The recency classification identifies a number of time windows the most recent previous user-device action was performed before a particular time point within the time period 406 (e.g., a time point corresponding to an end of training phase). The frequency classification identifies a number of times in which previous user-device actions were performed within the time period 406.

The training process 400 includes selecting a machine-learning model 416 for training. The selected machine-learning model is trained using the training dataset 416, in which various features are selected and configured through the feature selection process 410. Machine-learning model can be trained using supervised-learning, unsupervised-learning, and/or reinforcement-learning. In some instances, machine-learning model corresponds to one or more types of machine-learning models, including artificial neural networks, random forest, gradient-boosting trees, support vector machines, Bayesian networks, or genetic algorithms.

The training process 400 includes performing one or more configurations prior to training the selected machine-learning model 418. The training configuration 418 facilitates learning of parameters of the machine-learning model, such that the machine-learning model can accurately predict whether the follow-up interactive content will trigger the subsequent user-device action from a particular user. In some instances, the training configuration 418 includes selecting a type of training regime. The type of the training regime includes a fixed-duration training 420, in which the machine-learning model is trained once using the training dataset 402 and scored multiple times. The purpose of the fixed-duration training 420 is to mimic the actual usage condition when training is completed. For example, the training is performed once a month, and the scoring is performed multiple times in the future (e.g., every week for the next four weeks after training). In some instances, the type of training regime includes a periodic training 422, in which the machine-learning model is re-trained periodically as additional training datasets are added and/or existing training datasets are modified.

In some instances, the training dataset 402 includes substantially less positive classes relative to negative classes. To combat this class imbalance, the training configuration 414 allows hyperparameter tuning 424 that includes adjusting hyperparameters to assign lower weight values to negative classes and higher weight values to positive classes. The training process 400 further includes identifying user-defined threshold 426. The user-defined threshold is compared with a score generated for each data element of the training dataset 402. Such comparison facilitates the machine-learning model to generate a classification indicating whether the follow-up interactive content will trigger the subsequent user-device action from the particular user. In some instances, the user-defined threshold is adjusted based on changes of scores generated by the machine-learning model throughout training.

The training process 400 additionally includes configuring validation process for the selecting of the machine-learning model 428. As used herein, validation refers to a process used, as part of the training process 400, to evaluate the quality of a machine-learning model using a validation set and tune one or more hyperparameters of the machine-learning model based on its output. In some instances, the validation set is different from the training dataset 402, such that validation helps ensure that the machine-learning model's performance generalizes beyond the training set. The validation configuration 428 includes selecting a type of validation regime. The type of validation regime includes validation through a single-window 430, in which training data within a time window in the set of time windows is preserved for performing validation after each training phase of the machine-learning model. In some instances, the type of validation regime includes multiple-window validation 432, in which multiple time windows in the set of time windows are preserved for performing validation after each training phase of the machine-learning model.

(b) Training Data

In some instances, the training data corresponds to first-party activity data of the content provider system. The training data includes time-stamped activities for a set of users, in which each activity identifies a type of previous user-device action. In some instances, the training data is an activity log. In addition, two or more users in the training data can correspond to a particular entity. Additionally or alternatively, the training data can include third-party data corresponding the set of users. For example, the third-party data include roles, experience, other activities, associations to organizations, and others. FIG. 5 shows an example of an activity log 500 used for training a machine-learning model, according to some embodiments. The activity log 500 includes a plurality of data elements (e.g., rows), in which each data element includes an identifier of a user 502, an identifier indicating a type of an interactive content 504, an identifier indicating a type of user-device action 506, and a timestamp 508 indicating when the user-device action was performed. For example, the user identifier 502 corresponds to "###7###", which has been anonymized to train the machine-learning model without exposing personally identifiable information of the user. In the example shown in FIG. 5, a plurality of user-device actions are associated with the same user identifier 502.

The interactive-content identifier 504 identifies a type of the interactive content that was presented to the user. For example, the interactive-content identifier 504 has a numerical value of "19467," which corresponds to an email recommending a particular product or service. The user-device action identifier 506 identifies a type of user-device action performed in response to the presentation of the interactive-content. For example, the user-device action identifier 506 has a numerical value of "2," which corresponds to opening the recommendation email specified by the user-device action identifier 506. Examples of the types of user-device actions include, but are not limited to the following: (i) opening an interactive-content file; (ii) sending a message in response to the interactive-content file; (iii) clicking the interactive-content file; (iv) generating a task by the content provider system in response to the user-device action; (v) indicating by the content provider system that the user performing the user-device action has changed; (vi) designating, by the content provider system, the user as an "Add to Nurture" status; and (vii) designating, by the content provider system, the user-device action as an "Interesting Moment" status.

In some instances, the activity log 500 includes a previous classification 510 that indicates a first degree of likelihood that the user will perform a subsequent user-device action in response to the follow-up interactive content. For example, the previous classification 510 identifies that the user has been associated with a "known" stage, which indicates that the user is known to the content provider system. The activity log 500 further includes a new classification 512 that indicates a second degree of likelihood that the user will perform the subsequent user-device action in response to the follow-up interactive content. For example, the new classification 512 identifies that the user is associated with an "inquiry" stage, which indicates that the content provider system has provided interactive content requesting additional information from the user. In some instances, the new classification 512 is assigned in response to the type of user-device action 506.

(c) Feature Creation

The machine-learning model can be trained based on features corresponding to user-activity data (e.g., user-device actions specified in the activity log 500 of FIG. 5) collected up to a particular time point (e.g., the time period 406 of FIG. 4). The feature creation includes defining a time period covered during the training of the machine-learning model. In some instances, the feature creation includes defining a set of time windows within the time period. The features and target labels generated for the training data can vary based on a length of time specified for the time period and/or a size of a time window in the set of time windows.

In some instances, the feature creation includes, for user-device action identified in the activity log 500, whether the user-device action corresponds to a frequency feature or a recency feature. As described above, the frequency feature a number of times in which previous user-device actions were performed within the time period, and the recency feature indicates a number of time windows the most recent previous user-device action was performed before a particular time point within the time period.

The feature creation further includes identifying a target label for each user identified in the training data. In some instances, the target label identifies a categorical value that represents a predicted user-engagement level of the particular user in response to a presentation of the future interactive content. The target label can be assigned based on one or more types of user-device action associated with the user within the time period. For example, a positive target label is assigned in response to identifying that a user is associated with an opportunity stage. In another example, a negative target label is assigned to another user, in response to identifying that the user remains associated with a lead stage.

(d) Model Selection

In some embodiments, the machine-learning model includes one or more of gradient boosting decision trees (e.g., XGBoost framework, LightGBM framework), bagging procedures, boosting procedures, and/or random forest algorithms. For example, a gradient-boosted decision tree can be trained to generate an output including a categorical value that represents a predicted user-engagement level of the user in response to a presentation of the future interactive content. Gradient boosting corresponds to a type of machine learning technique that can be used for regression and classification problems and for producing a prediction model that may include an ensemble of weak prediction models, e.g., decision trees.

Various machine-learning techniques may be used to train the machine-learning models. A machine-learning technique may include decision-tree learning, association-rule learning, an artificial neural network, deep learning, inductive logic programming, a support vector machine, clustering, a Bayesian network, reinforcement learning, representation learning, similarity and metric learning, sparse dictionary learning, a genetic algorithm, and/or rule-based machine learning. A machine-learning technique can include an ensemble technique, which learns inter-ensemble weights to apply to results produced from various underlying techniques (such as two or more of those previously mentioned). The inter-ensemble weights may be identified based on (for example) accuracy, speed and/or resource usage associated with the underlying techniques.

(e) Training

For the training phase, the training system identifies a time period and set of time windows that were defined during the feature creation phase. The training system can structure the training phase by splitting the time period into a training subperiod comprising a first subset of time windows and a validation subperiod comprising a second subset of time windows. Various parameters can be configured for the set of time windows. For example, a unit of time as days is selected for the set of time windows, although other units of time can be selected for training the machine-learning model.

In some instances, the training subperiod includes a set of time windows for feature creation and a label creation window, in which these two time windows can be a mutually exclusive time period to each other. The label creation window corresponds a time duration after the user-device action is performed, at which the target labels are generated for comparing the outputs generated by the machine-learning model. For example, the machine-learning model is trained to predict user-engagement level at 3 weeks after the user-device action is performed. The target label is then generated for such future time point (e.g., during the label creation window) and compared with the prediction performed by the machine-learning model, at which one or more parameters of the machine-learning model are learned.

Similarly, the validation subperiod includes respective feature creation windows and a label creation window. The mutually exclusive time periods in feature and label creations prevent label leakage and curb biasing of model results. In some instances, the training subperiod is separated in time from validation subperiod to avoid biasing results in validation through potential information leakage from the training regime.

Figure 6:
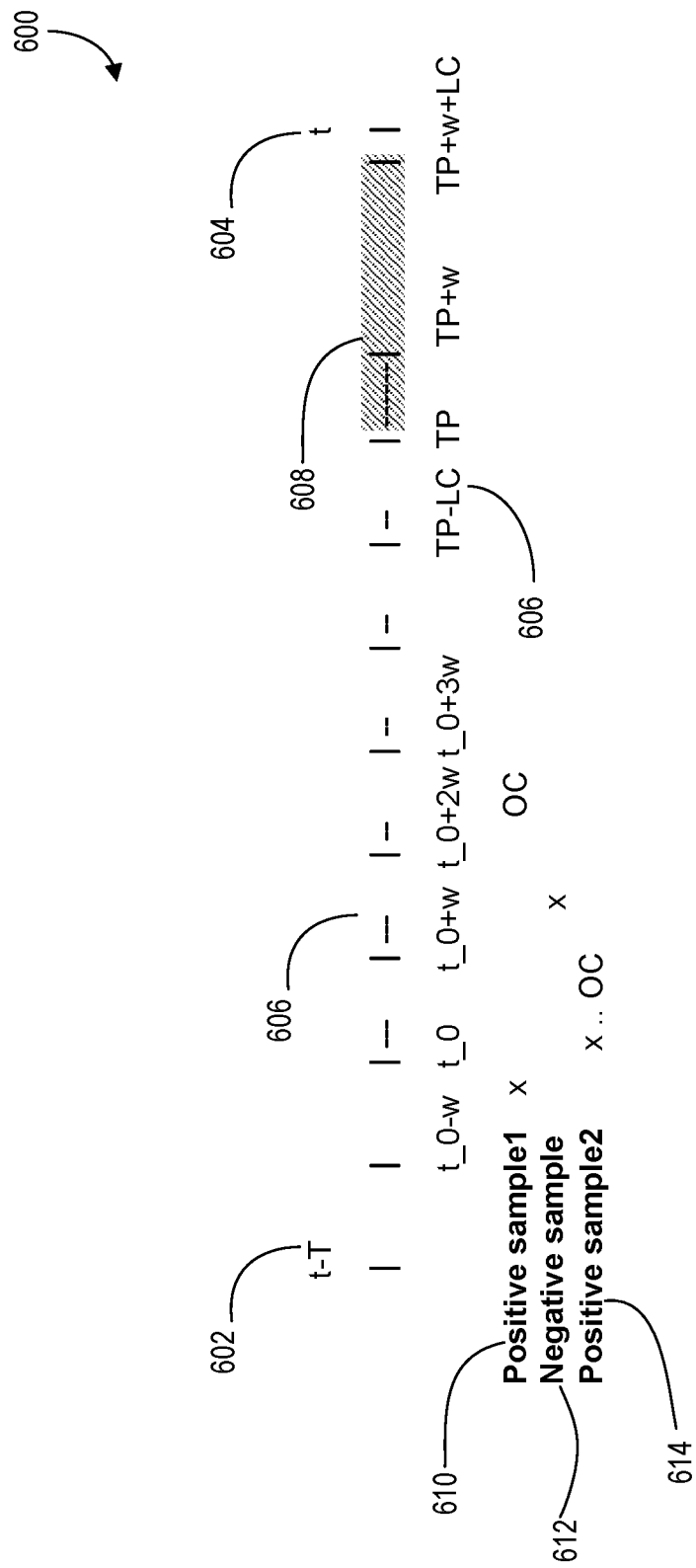
FIG. 6 illustrates an example of a schematic diagram for configuring a training phase, according to some embodiments.

FIG. 6 illustrates an example of a schematic diagram 600 for configuring a training phase, according to some embodiments. The schematic diagram 600 includes a time period comprising a starting time 602 identified as "t-T" and an ending time 604 identified as "t." The time period between t-T and t are divided into a set of time windows 606. For example, the set of time windows 606 are identified as a range of time between a first time point "t_0" and a second time point "t_0+w." The character "w" identified a size of the time window, which can be specified by user during the feature creation phase. For example, the size of the time window is 4 days, 7 days, and/or 15 days. In some instances, the size of the time window is selected depending on the input data to be processed or a forecast horizon to be selected for the machine-learning model.

As described above, the time period can be divided into a training subperiod and a validation subperiod. In FIG. 6, the two subperiods are divided by the time point "TP." For example, the training subperiod includes time windows within the time range (t-T, TP], and the validation subperiod includes time windows within the time range (TP, t]. Each subperiod is divided into a first set of time windows for generating features and a second set of time windows for creating target labels. For example, validation subperiod includes feature creation at time window (TP, TP+w] and a label creation window (TP+w, TP+w+LC], where TP+w+LC≤t.

The training phase also includes, for each subperiod (e.g., validation subperiod), defining a time range for label creation 608, which is identified as "LC." The label creation 608 specifies a future time point for generating a target label, in which the future time point is defined by "LC" duration (e.g., 14 days) elapsed from the time when a particular user-device action has been performed. In the example shown in FIG. 6, the "LC" value is determined at 14 days, such that the machine-learning model is trained to predict the user-engagement level at 14 days after the user-device action has been performed. In some instances, the label creation 608 is a user-tunable time point. To train the machine-learning model using training data collected during a time window x, features are initially created for user-device actions associated with a user, and the prediction of user-engagement level for the user can be performed at time point x+LC. For the training subperiod, the last time window for feature creation is TP-LC, which allows target labels to be created for user-device actions while keeping data from the validation period separate. Thus, no information leakage occurs from a positive sample in validation into training data.

As shown in FIG. 6, the time period (t-T, t) is divided into a set of time windows t_0, t_0+w, t_0+2w, t_0+3w . . . , in which "w" specifies the size of the time window. In some instances, the size of the time window is less than the time range assigned for label creation "LC." For each time window, features are updated for the user. For example, a user performs its first user-device action in response to an interactive content at time window t_0. The user then performs a second user-device action that is indicative of a presentation of the follow-up interactive content will trigger a subsequent user-device action, in which the second user-device action is performed within the time window (t_0+2w, t_0+3w]. Subsequently, the user initially predicted with a first categorical value corresponding to a non-opportunity creation ("non-OC") stage at time points t_0+LC, t 0_+w+LC, and t_0+2w+LC can be updated with a second categorical value corresponding to an opportunity creation ("OC") stage. In some instances, recency and/or frequency features are updated for each time window, even when there is no activity since the previous time window(s).

In particular, the training system cannot look ahead and know "when" the user becomes responsive only by evaluating the first user-device action, even when an administrator of the training system has knowledge of whether the user will perform the subsequent user-device actions during the data observation period. The user thus remains a candidate for prediction and continues to be processed by the machine-learning model over the course of the time period. For the same reasons above, the machine-learning model is trained to predict, for each time window, a probability of user-engagement level of a user after LC days. As a result, for positive sample, the machine-learning model generates predicted output at multiple instances for a given user in the training dataset, in which each instance corresponds a time window at which the user is predicted to be non-responsive (e.g., the non-OC stage) until the time period ends or until training reaches a time window in which the user is predicted to be responsive (e.g., the OC stage).

Continuing with the examples in FIG. 6, consider three samples of the training dataset have been presented. With respect to the three samples 610, 612, and 614, two positive samples and one negative sample are identified in the time period. In a positive sample 610, the user performs its first user-device action within a time window (t_0-w, t_0] and performs another user-device action that triggers the categorical value being changed to OC stage in time window (t_0+2w, t_0+3w]. Thus, the user in the positive sample 610 remains in training phase as non-responsive (e.g., non-OC) for three instances of time windows (t_0-w, t_0], (t_0, t_0+w], and (t_0+w, t_0+2w].

In a negative sample 612, a second user performs its first user-device action in time window (t_0+w, t_0+2w], but does not perform any other user-device actions that trigger the user-engagement level classification within the training period (t-T, TP-LC]. In this instance, the second user of the negative sample 612 remains labeled with a categorical value corresponding to non-OC stage through multiple time windows until the time point TP-LC.

In a positive sample 614, a third user performs its first user-device action in time window (t_0, t 0+w] and performs another user-device action that triggers the user-engagement level classification (e.g., OC) in the same time window. However, the likelihood of losing meaningful information increases in the positive sample 614, since the machine-learning model would predict the user-engagement level based on a single time window without consideration of multiple user-device actions. In such cases, the training phase can be configured such that the size of the time window "w" is smaller.

(f) Validation

Figure 7:
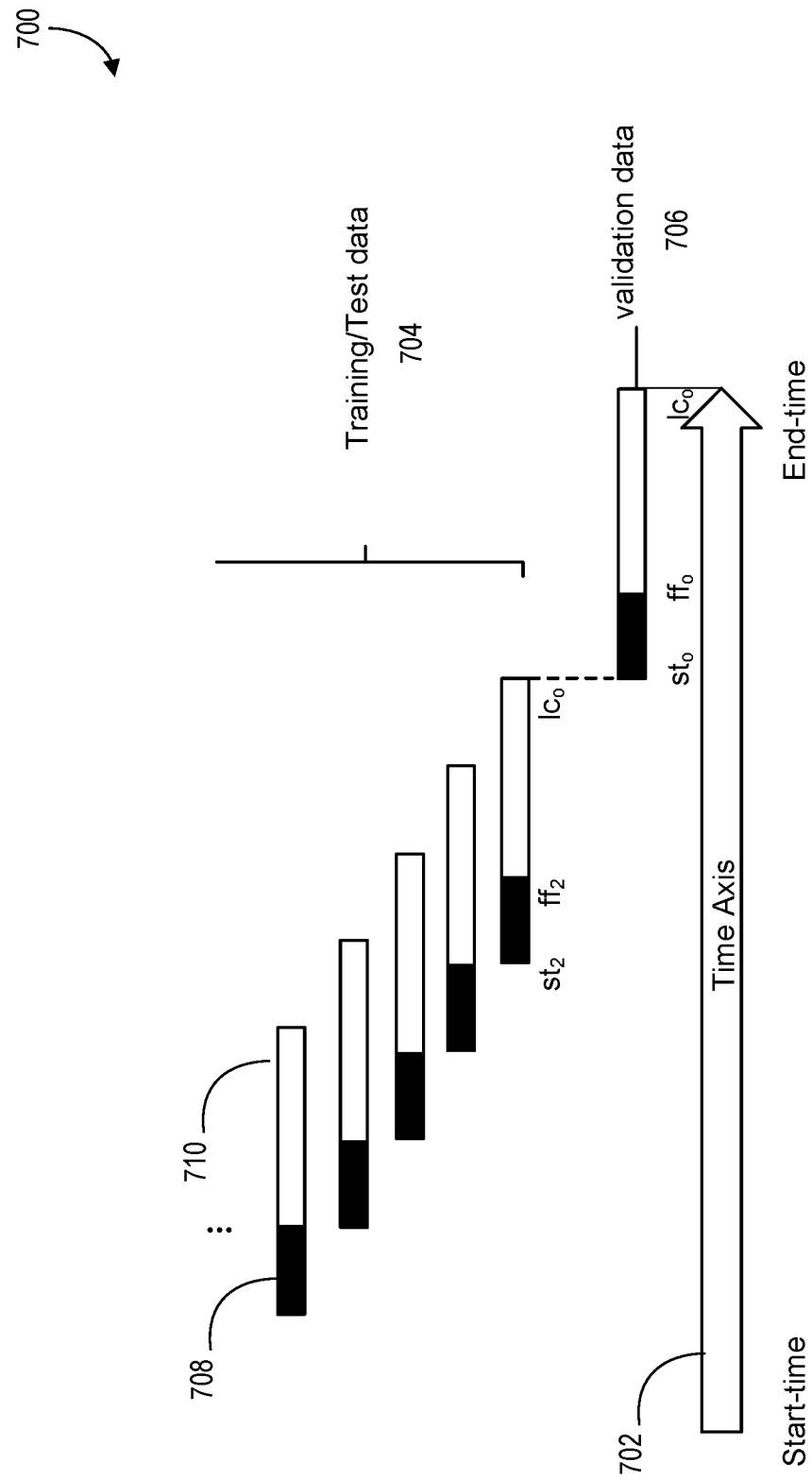
FIG. 7 illustrates an example of a schematic diagram used for training and validation performed to evaluate performance of machine learning models across different training configurations.

Validation can be performed during a validation subperiod of the time period. As described above, the validation is used to evaluate the quality of a machine-learning model using a validation set (e.g., part of the training dataset that were held out during training phase of the machine-learning model) and tune one or more hyperparameters of the machine-learning model based on its output. FIG. 7 illustrates an example of a schematic diagram 700 used for training and validation performed to evaluate performance of machine learning models across different training configurations. The schematic diagram 700 includes a time period 702 covered during the training and validation process. The time period 702 includes two subperiods, including a training subperiod 704 for training the machine-learning model by using a training dataset covered by a first set of time windows and a validation subperiod 706 for validating the machine-learning model by using a validation dataset covered by a second set of time windows. Each time window includes a feature creation sub-window 708 and a label creation sub-window 710.

Table 1 provides a set of results generated by machine-learning model validations across different training configurations, including disparate durations of time periods. Table 1 also shows the validation performed to evaluate the performance of the machine-learning model based on a number of features and type of data split (e.g., time split or random split). For example, the split of data by time involves dividing a time period into a training subperiod including time windows corresponding to weeks 1-9 and a validation subperiod including time windows corresponding to weeks 10-11. For random data splits, the training dataset in the time period is split randomly.

TABLE 1

Machine-learning model performance with different numbers of features, duration of training data, and size of time windows

| Set # | Time Period | Number of Features | Window size | Data Split | AUC |
|---|---|---|---|---|---|
| 0 | 3 months | 42 features | 4 days | by time | 0.7803 |
| 1 | 3 months | 42 features | 4 days | random | 0.8446 |
| 2 | 3 months | 88 features | 4 days | random | 0.9023 |
|   |          | 86 features | 4 days | random | 0.8932 |
| 3 | 7 months | 88 features | 4 days | random | 0.9451 |
|   |          | 86 features | 4 days | random | 0.9489 |
| 4 | 12 months | 88 features | 15 days | random | 0.8646 |
|   |           | 86 features | 15 days | random | 0.8343 |

As shown in Table 1, the area-under-curve (AUC) values are shown for each type of training configuration. The AUC values represent evaluation metrics that are indicative of machine-learning model performance. In one example, the AUC values can be Area under the ROC curve values, which indicates probability that a classifier will be more confident that a randomly chosen positive example is actually positive than that a randomly chosen negative example is positive. In another example, the AUC values can be Area under the interpolated precision-recall curve values, which are obtained by plotting (recall, precision) points for different values of the classification threshold.

The AUC values indicate that an improved performance of the machine-learning model trained using smaller window size configuration (e.g., 4 days), a larger number of features (e.g., 88 features), and a longer time period (e.g., 7 months). Further, the AUC values corresponding to validation dataset #3 are higher than the AUC values of validation dataset #4, despite the time period being longer for validation dataset #4. This may indicate that, for this particular machine-learning model, a smaller size window is associated with better performance and accuracy.

Examples of Training Configurations

Other various training configurations were used to train the machine-learning model to generate an output including a categorical value that represents a predicted user-engagement level of the user in response to a presentation of the future interactive content. For example, the two categories of training configurations included: (i) a fixed-duration training, in which the machine-learning model is trained once and scored multiple times; and (ii) a periodic training, in which the machine-learning model is trained periodically as additional data becomes available. In addition, two categories of validation configuration were used, including: (a) a single-window validation; and (b) multiple-windows validation. For each variation of the above four categories, an empirical design is shown followed by model performance results.

(a) Fixed-Duration Training

Figure 8:
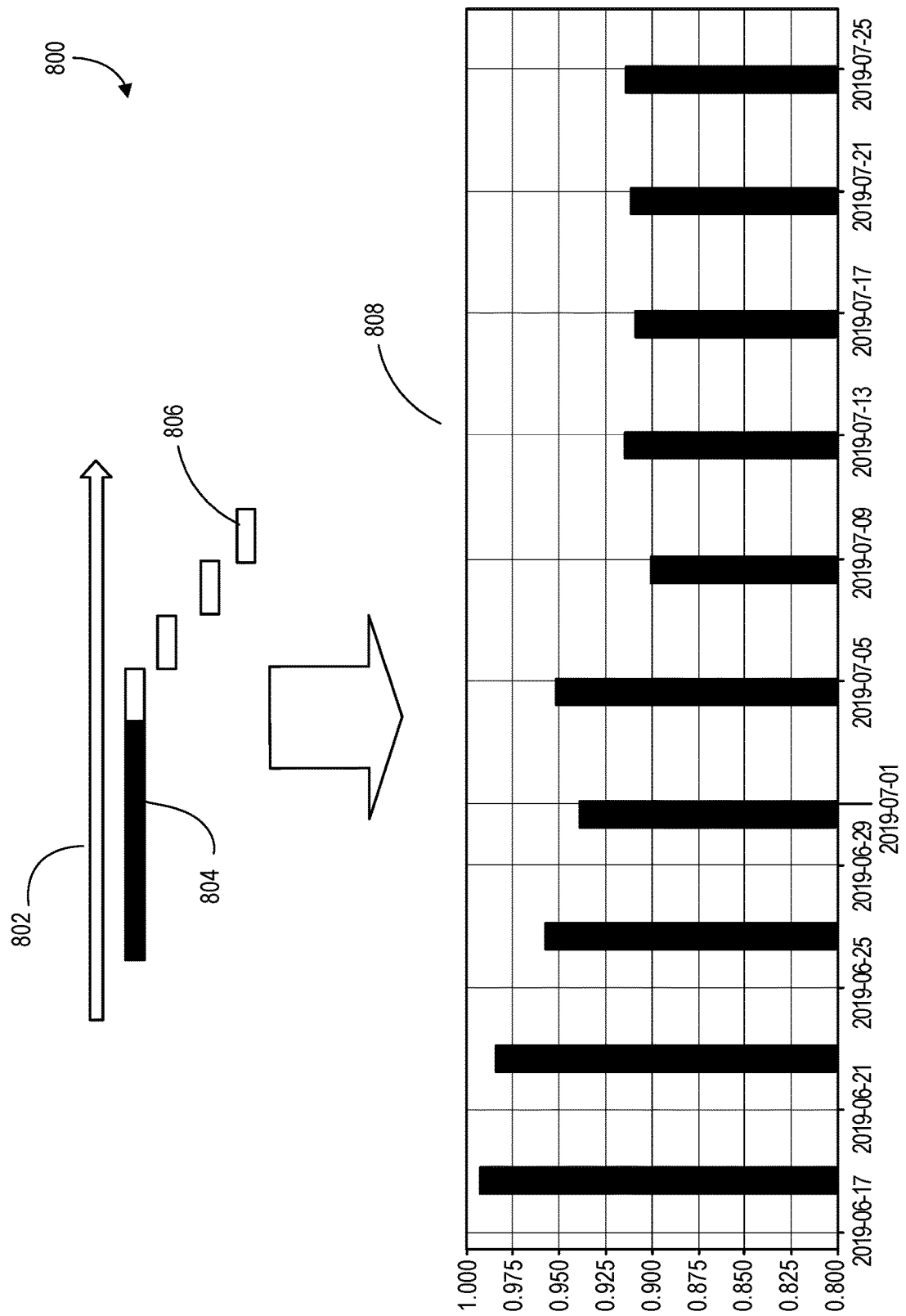
FIG. 8 illustrates an example of a first training configuration for training a machine-learning model for predicting user-engagement level.

FIG. 8 illustrates an example of a first training configuration 800 for training a machine-learning model for predicting user-engagement level. The first training configuration 800 included a training subperiod 804 within a time period 802, in which the training of the machine-learning model was conducted. In addition, the first training configuration 800 also included a validation subperiod 806 within the time period 902, in which performance of the trained machine-learning model was evaluated. The validation subperiod 806 included time windows that do not overlap with each other. In the first training configuration 800, performance of the machine-learning model was evaluated using the following criteria: (i) 86 features; and (ii) random split of training dataset and test dataset having a ratio of 75:25.

Continuing with the example in FIG. 8, a bar graph 808 shows a set of validation results for each time window of the validation subperiod 806. X-axis of the bar graph 808 represents starting dates of time windows of the validation subperiod 806, and Y-axis of the bar graph 808 represents AUC values that are determined for each time window. As shown in the bar graph 808, the AUC values for the time windows decrease over the time period 802. This is probably due to the training being performed only once, such that the parameters learned by the trained machine-learning model becomes less relevant as data from later time windows are processed. Nonetheless, all of the AUC values generated during validation are over 0.9, which are indicative of the machine-learning model accurately predicting the user-engagement level.

Figure 9:
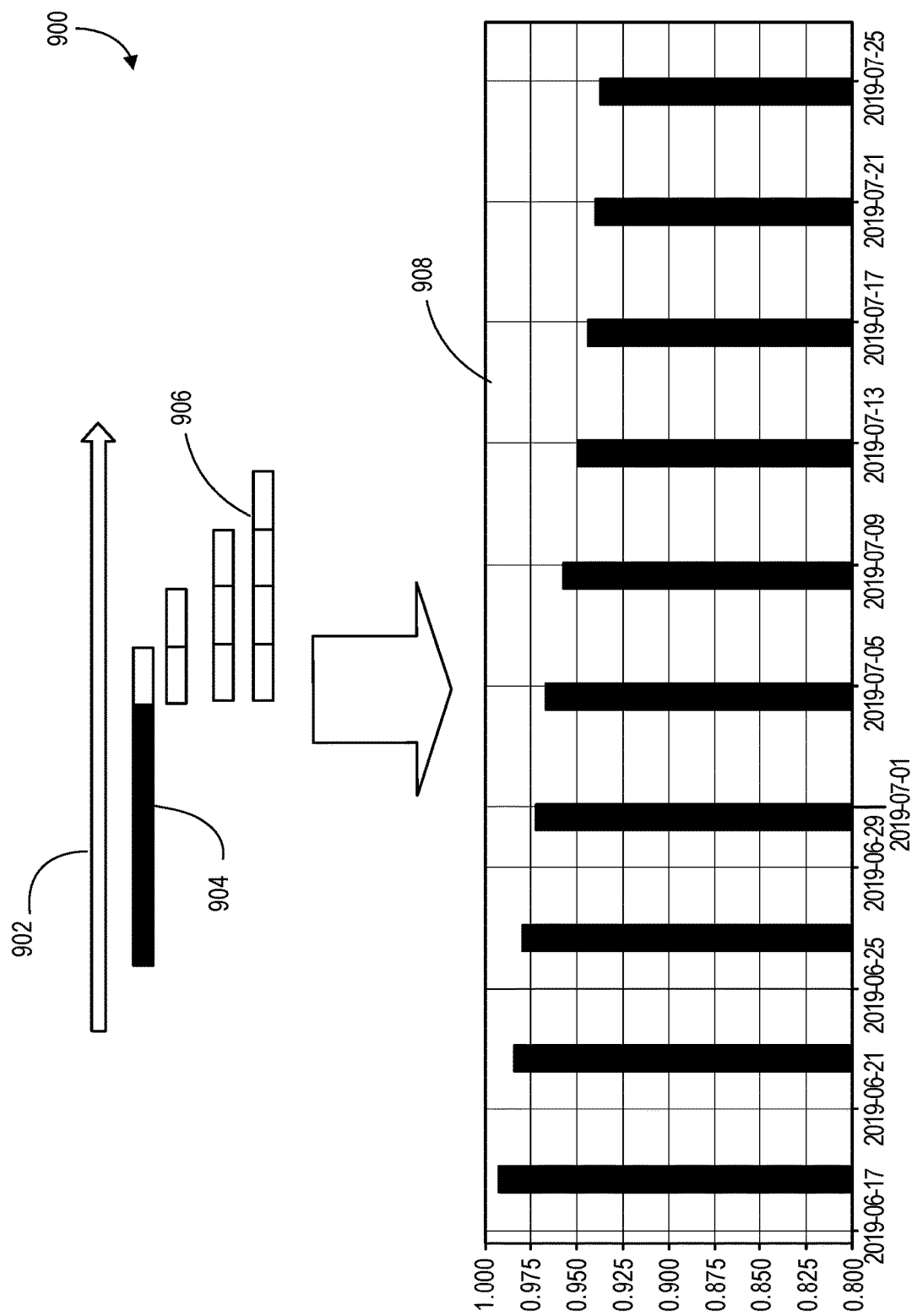
FIG. 9 illustrates an example of a second training configuration for training a machine-learning model for predicting user-engagement level.

FIG. 9 illustrates an example of a second training configuration 900 for training a machine-learning model for predicting user-engagement level. The second training configuration 900 included a training subperiod 904 within a time period 902, in which the training of the machine-learning model was conducted once. In addition, the second training configuration 900 also included a validation subperiod 906 within the time period 902, in which performance of the trained machine-learning model was evaluated. Further, each validation time window of the validation subperiod 906 included one or more previous validation time windows. For example, the validation time windows included a first time window of the validation subperiod 906, a second time window that included data from the first time window, and a third time window that included data from the first and second time windows. In the second training configuration 900, performance of the machine-learning model was evaluated using the following criteria: (i) 86 features; and (ii) random split of training dataset and test dataset having a ratio of 75:25.

Continuing with the example in FIG. 9, a bar graph 908 shows a set of validation results for each time window of the validation subperiod 906. X-axis of the bar graph 908 represents starting dates of time windows of the validation subperiod 906, and Y-axis of the bar graph 908 represents AUC values that are determined for each time window. As shown in the bar graph 908, the AUC values for the time windows decrease over the time period 902, though at a slower rate than the first training configuration 800. This is likely because each time window in the validation subperiod 906 included data from its previous time window(s), which can be more accurately predicted by the trained machine-learning model relative to data from the later time windows. In the second training configuration 900, all of the AUC values generated during validation are over 0.925.

(b) Periodic Training

Figure 10:
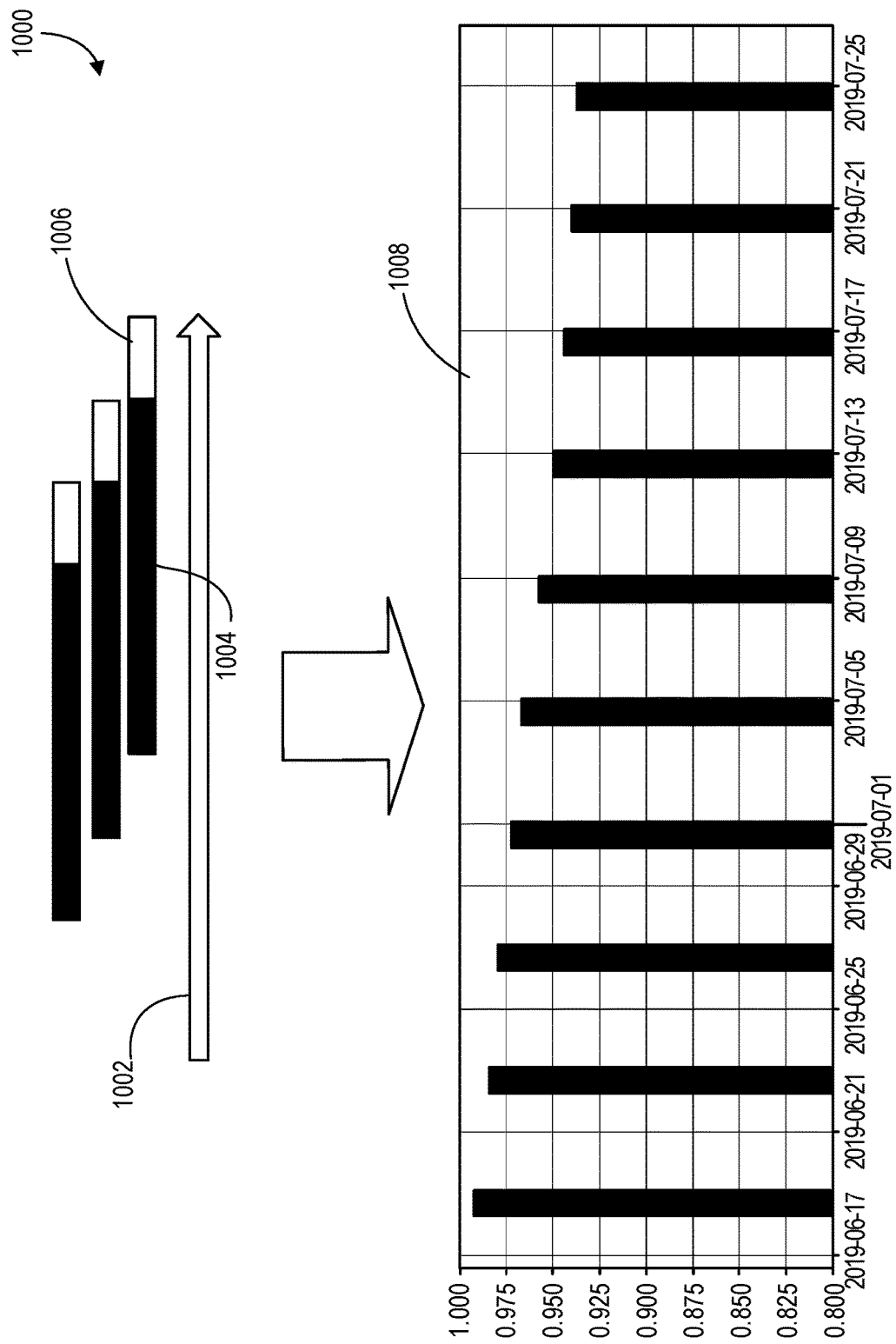
FIG. 10 illustrates an example of a third training configuration for training a machine-learning model for predicting user-engagement level.

FIG. 10 illustrates an example of a third training configuration 1000 for training a machine-learning model for predicting user-engagement level. The third training configuration 1000 included a training subperiod 1004 within a time period 1002, in which the training of the machine-learning model was conducted across multiple time windows having the same size. The third training configuration 1000 also included a validation subperiod 1006 within the time period 1002, in which performance of the trained machine-learning model was evaluated. The validation subperiod 1006 included time windows. Each of the validation time windows follows a corresponding training time window thereby forming a time window pair for training the machine-learning model. For example, a first training time window is followed by a first validation window and a second training time window is followed by a second validation window. As shown in FIG. 10, a training and validation window pair can overlap with another training and validation window pair. In the third training configuration 1000, performance of the machine-learning model was evaluated using the following criteria: (i) 86 features; and (ii) random split of training dataset and test dataset having a ratio of 75:25.

Continuing with the example in FIG. 10, a bar graph 1008 shows a set of validation results for each time window of the validation subperiod 1006. X-axis of the bar graph 1008 represents starting dates of time windows of the validation subperiod 1006, and Y-axis of the bar graph 1008 represents AUC values that are determined for each time window. As shown in the bar graph 1008, the AUC values are generally above 0.925, except for time window "2010-07-09." In comparison to the first training configuration 800 of FIG. 8, the multiple training window over the time period 1002 improves the performance of the machine-learning model for predicting user-engagement level.

Figure 11:
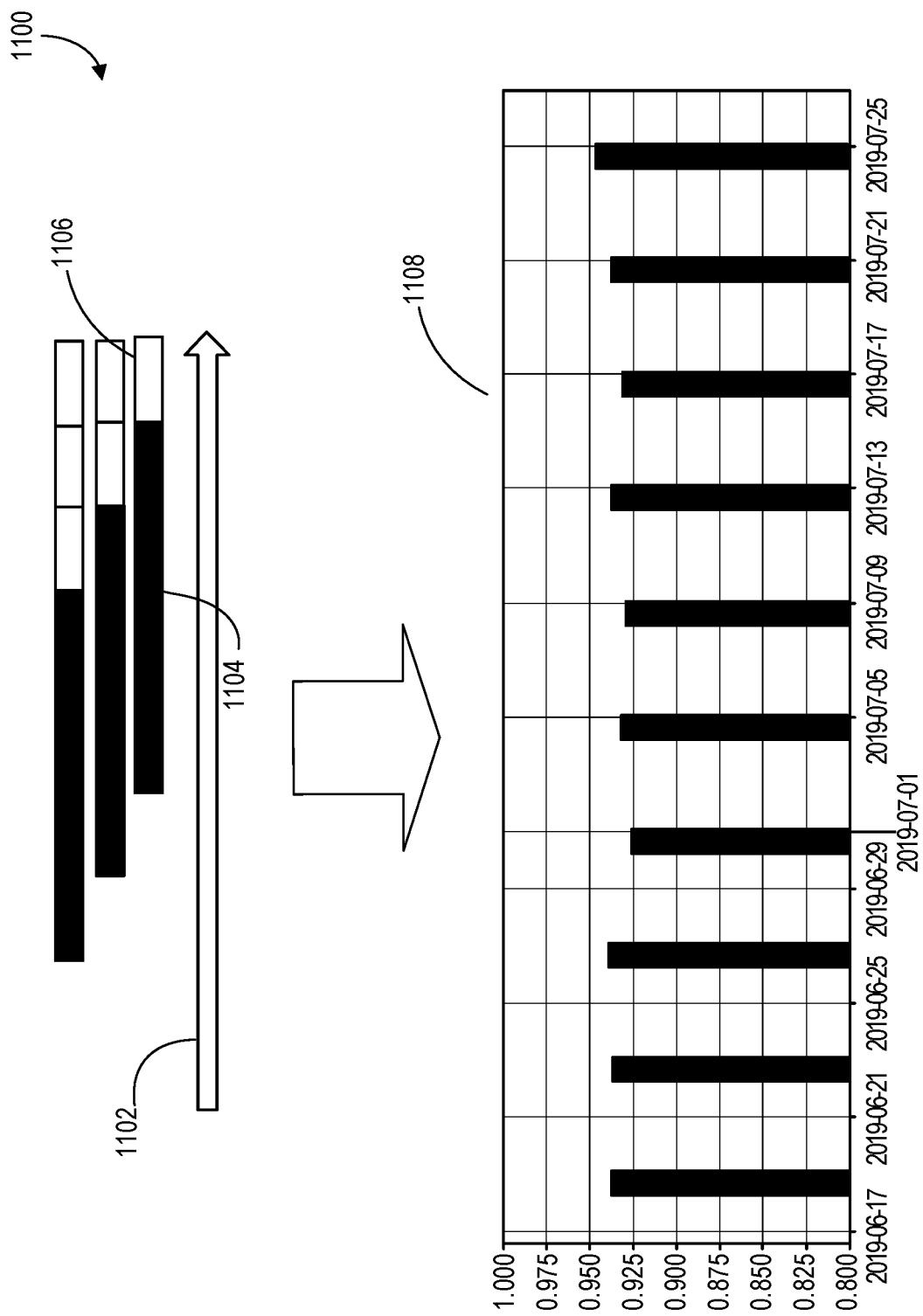
FIG. 11 illustrates an example of a fourth training configuration for training a machine-learning model for predicting user-engagement level.

FIG. 11 illustrates an example of a fourth training configuration 1100 for training a machine-learning model for predicting user-engagement level. The fourth training configuration 1100 included a training subperiod 1104 within a time period 1102, in which the training of the machine-learning model was conducted across multiple time windows having the same size. The fourth training configuration 1100 also included a validation subperiod 1106 within the time period 1102, in which performance of the trained machine-learning model was evaluated. The validation subperiod 1106 included time windows. Each of the validation time windows follows a corresponding training time window thereby forming a time window pair for training the machine-learning model. For example, a first training time window is followed by a first validation window and a second training time window is followed by a second validation window. As shown in FIG. 11, a training and validation window pair can overlap with another training and validation window pair. Moreover, each validation time window included one or more previous validation time windows. For example, the validation time windows included a first time window of the validation subperiod 1106, a second time window that included data from the first time window, and a third time window that included data from the first and second time windows. In the fourth training configuration 1100, performance of the machine-learning model was evaluated using the following criteria: (i) 86 features; and (ii) random split of training dataset and test dataset having a ratio of 75:25.

Continuing with the example in FIG. 11, a bar graph 1108 shows a set of validation results for each time window of the validation subperiod 1106. X-axis of the bar graph 1108 represents starting dates of time windows of the validation subperiod 1106, and Y-axis of the bar graph 1108 represents AUC values that are determined for each time window. As shown in the bar graph 1108, the AUC values are generally above 0.925, thereby providing consistent machine-learning model performance across different time windows. In comparison to other training configurations, the fourth training configuration 1100 performs slightly worse for earlier time windows, although the performance level is maintained over the course of the time period 1102.

Example of a General Computing Environment

Figure 12:
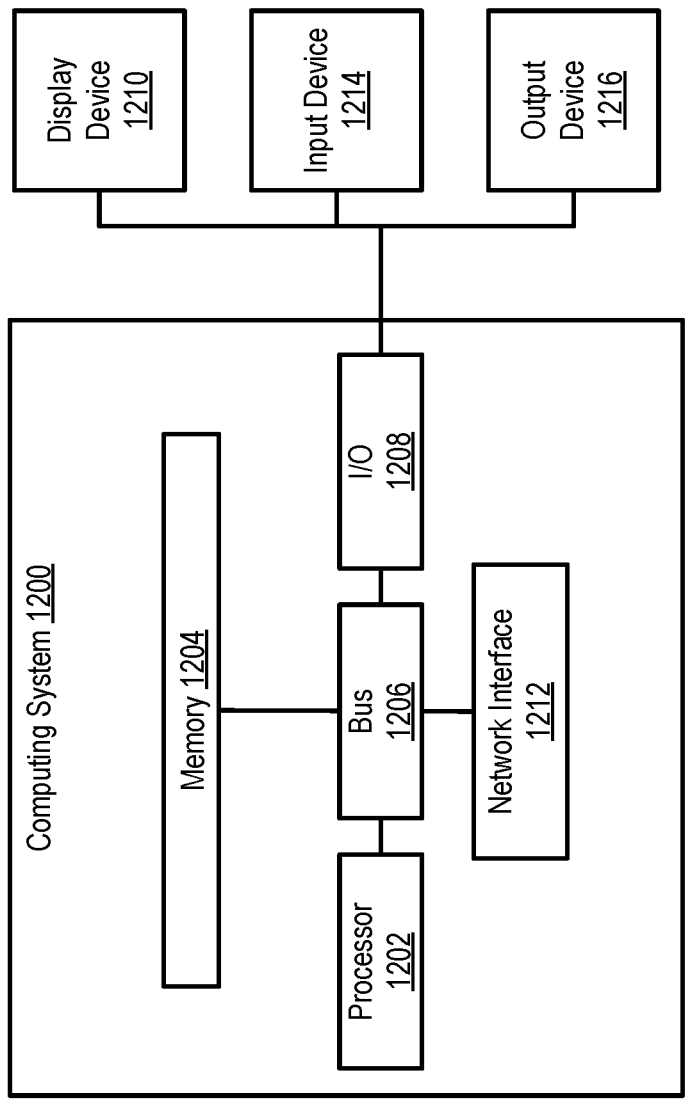
FIG. 12 depicts a computing system configured for provisioning interactive content based on predicted user-engagement levels in accordance with some embodiments.

Any suitable computing system or group of computing systems can be used for performing the operations described herein. For example, FIG. 12 depicts a computing system 1200 that can implement any of the computing systems or environments discussed above. In some embodiments, the computing system 1200 is a content provider system 102 of FIG. 1 that includes a processing device 1202, a memory that stores various data computed or used by the content provider system 102, an input device 1214 (e.g., a mouse, a stylus, a touchpad, or a touchscreen), and an output device 1216 that presents output to a user (e.g., a display device that displays graphical content generated by the content provider system 102). For illustrative purposes, FIG. 12 depicts a single computing system on which the content provider system 102 is executed, and the input device 1214 and output device 1216 are present. But these applications, datasets, and devices can be stored or included across different computing systems having devices similar to the devices depicted in FIG. 12.

The example of FIG. 12 includes a processing device 1202 communicatively coupled to one or more memory devices 1204. The processing device 1202 executes computer-executable program code stored in a memory device 1204, accesses information stored in the memory device 1204, or both. Examples of the processing device 1202 include a microprocessor, an application-specific integrated circuit ("ASIC"), a field-programmable gate array ("FPGA"), or any other suitable processing device. The processing device 1202 can include any number of processing devices, including a single processing device.

The memory device 1204 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 1200 could also include a number of external or internal devices, such as a display device 1210, or other input or output devices. For example, the computing system 1200 is shown with one or more input/output ("I/O") interfaces 1208. An I/O interface 1208 can receive input from input devices or provide output to output devices. One or more buses 1206 are also included in the computing system 1200. Each bus 1206 communicatively couples one or more components of the computing system 1200 to each other or to an external component.

The computing system 1200 executes program code that configures the processing device 1202 to perform one or more of the operations described herein. The program code includes, for example, code implementing the content provider system 102 or other suitable applications that perform one or more operations described herein. The program code can be resident in the memory device 1204 or any suitable computer-readable medium and can be executed by the processing device 1202 or any other suitable processor. In some embodiments, all modules in the content provider system 102 are stored in the memory device 1204, as depicted in FIG. 12. In additional or alternative embodiments, one or more of these modules from the content provider system 102 are stored in different memory devices of different computing systems.

In some embodiments, the computing system 1200 also includes a network interface device 1212. The network interface device 1212 includes any device or group of devices suitable for establishing a wired or wireless data connection to one or more data networks. Non-limiting examples of the network interface device 1212 include an Ethernet network adapter, a modem, and/or the like. The computing system 1200 is able to communicate with one or more other computing devices (e.g., a computing device that receives inputs for content provider system 102 or displays outputs of the content provider system 102) via a data network using the network interface device 1212.

An input device 1214 can include any device or group of devices suitable for receiving visual, auditory, or other suitable input that controls or affects the operations of the processing device 1202. Non-limiting examples of the input device 1214 include a touchscreen, stylus, a mouse, a keyboard, a microphone, a separate mobile computing device, etc. An output device 1216 can include any device or group of devices suitable for providing visual, auditory, or other suitable sensory output. Non-limiting examples of the output device 1216 include a touchscreen, a monitor, or a separate mobile computing device.

Although FIG. 12 depicts the input device 1214 and the output device 1216 as being local to the computing device corresponding to the content provider system 102, other implementations are possible. For instance, in some embodiments, one or more of the input device 1214 and the output device 1216 include a remote client-computing device that communicates with the computing system 1200 via the network interface device 1212 using one or more data networks described herein.

General Considerations

Numerous specific details are set forth herein to provide a thorough understanding of the claimed subject matter. However, those skilled in the art will understand that the claimed subject matter could be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages could be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values could, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, could readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   accessing, by a content provider system, a machine-learning model configured to predict user-engagement levels of users in response to presentation of future interactive content of a targeted campaign initiated by the content provider system, wherein the machine-learning model was trained using a training dataset including previous user-device actions performed by a plurality of users in response to previous interactive content associated with other campaigns, and wherein the machine-learning model was trained at least by:
   identifying a time period within which the previous user-device actions were performed;
   splitting the time period into a set of time windows; and
   training, for a subset of time windows of the set of time windows, the machine-learning model using a subset of the training dataset corresponding to a time window of the subset of time windows, wherein the subset of the training dataset includes previous user-device actions performed by at least one of the plurality of users and identified as being performed within the time window, wherein a duration of the time window is adjustable based on user-device actions in a corresponding subset of training dataset during training, and wherein training the machine-learning model comprises creating a target label representing a known user-engagement level of a user associated with the subset of training dataset;
   receiving, by the content provider system, user-activity data of a particular user, wherein the user-activity data includes one or more user-device actions performed by the particular user in response to an interactive content of the targeted campaign;
   applying, by the content provider system, the machine-learning model to the user-activity data to generate an output including a categorical value that represents a predicted user-engagement level of the particular user at a particular future time point in response to a presentation of the future interactive content of the targeted campaign, wherein the particular future time point is defined by a preconfigured duration of time elapsed from a time when a particular user-device action is performed in response to the interactive content of the targeted campaign;
   selecting, by the content provider system, a follow-up interactive content that is associated with the categorical value of the output, wherein resources allocated for generating the follow-up interactive content are determined in accordance with the outputted categorical value; and
   transmitting, by the content provider system, the follow-up interactive content to a user device of the particular user, such that the user device displays the follow-up interactive content.

2. The method of claim 1, wherein the time period includes a first time subperiod for training the machine-learning model and a second time subperiod for validating performance of the machine-learning model.

3. The method of claim 2, wherein the first time subperiod includes a first subset of time windows and the second time subperiod includes a second subset of time windows.

4. The method of claim 1, wherein the user-activity data further includes one or more actions performed by the content provider system in response to analyzing the one or more user-device actions performed by the particular user.

5. The method of claim 1, wherein training the machine-learning model using the subset of the training dataset includes:
   identifying a first previous user-device action of the subset performed by a previous user during a first time point of the time window;
   identifying a second previous user-device action of the subset performed by the previous user during a second time point of the time window, wherein the second time point is at a subsequent time relative to the first time point;
   applying the machine-learning model to the first and second previous user-device actions to generate another output including another categorical value that represents another predicted user-engagement level of the previous user in response to the presentation of the future interactive content;
comparing the other output with the target label associated with the second previous user-device action; and
modifying, based on the comparison, one or more hyperparameters associated with the machine-learning model.

6. The method of claim 1, wherein the machine-learning model is a gradient boosting algorithm.

7. The method of claim 1, wherein selecting the follow-up interactive content includes determining, based on the categorical value, whether to present the follow-up interactive content at the particular future time point.

8. A system comprising one or more processors and a memory having stored thereon instructions that, upon execution by the one or more processors, cause the one or more processors to perform one or more operations, the system further comprising:
   a content generator configured to:
      transmit, to a user device, interactive content for a user, wherein the interactive content is associated with a targeted campaign initiated by a content provider system;
      receive, from a classifier subsystem, an output including a categorical value that represents a predicted user-engagement level of the user in response to a presentation of future interactive content associated with the targeted campaign;
      select a particular follow-up interactive content from a set of follow-up interactive content by using the categorical value as input, wherein resources allocated for generating the particular follow-up interactive content are determined in accordance with the categorical value; and
      transmit the particular follow-up interactive content to the user device, such that the user device displays the particular follow-up interactive content; and
   the classifier subsystem configured to:
      access user-activity data of the user, wherein the user-activity data includes a type of the interactive content and one or more user-device actions performed in response to the transmission of the interactive content to the user device;
      apply a machine-learning model to the user-activity data to generate the output that includes the categorical value that represents the predicted user-engagement level of the user at a particular future time point in response to a presentation of a future interactive content of the targeted campaign, wherein the particular future time point is defined by a preconfigured duration of time elapsed from a time when a particular user-device action is performed in response to the interactive content of the targeted campaign, wherein the machine-learning model was trained using a training dataset including previous user-device actions performed by a plurality of users in response to previous interactive content associated with other campaigns, and wherein the machine-learning model was trained at least by:
         identifying a time period within which the previous user-device actions were performed;
         splitting the time period into a set of time windows;
         training, for a subset of time windows of the set of time windows, the machine-learning model using a subset of the training dataset corresponding to a time window of the subset of time windows, wherein the subset of the training dataset includes previous user-device actions performed by at least one of the plurality of users and identified as being performed within the time window, wherein a duration of the time window is adjustable based on user-device actions in a corresponding subset of training dataset during training, wherein training the machine-learning model comprises creating a target label representing a known user-engagement level of a user associated with the subset of training dataset; and
      transmit the output to the content generator to trigger selection of the particular follow-up interactive content.

9. The system of claim 8, wherein the machine-learning model was trained using a training dataset including previous user-device actions performed by a plurality of users in response to previous interactive content, and wherein the machine-learning model was trained at least by:
   identifying a time period within which the previous user-device actions were performed;
   splitting the time period into a set of time windows; and
   training, for a time window of the set of time windows, the machine-learning model using a subset of the training dataset, wherein the subset includes previous user-device actions performed by at least one of the plurality of users and identified as being performed within the time window.

10. The system of claim 9, wherein the training dataset includes a plurality of training data elements, wherein each of the plurality of training data elements identifies: (i) information associated with a previous user; (ii) a type of previous interactive content; (iii) a previous user-device action performed in response to presentation of the previous interactive content; and (iv) a time stamp identifying when the previous user-device action was performed.

11. The system of claim 9, wherein the machine-learning model was validated using a validation data set that includes a subset of previous user-device actions performed during a last time window of the set of time windows.

12. The system of claim 8, wherein the one or more user-device actions are performed by the user, wherein the one or more user-device actions include generating a response message in response to a presentation of the interactive content.

13. The system of claim 8, wherein the machine-learning model is a gradient boosting algorithm.

14. The system of claim 8, wherein the content generator is further configured to determine, based on the categorical value, not to present follow-up interactive content to be presented at the particular future time point.

15. A computer program product tangibly embodied in a non-transitory machine-readable storage medium including instructions configured to cause one or more data processors to perform actions including:
   accessing user-activity data of a user, wherein the user-activity data includes a type of interactive content of a targeted campaign initiated by a content provider system and one or more user-device actions performed in response to presentation of the interactive content of the targeted campaign to the user;
   a step for applying a machine-learning model to the user-activity data to generate an output including a categorical value that represents a predicted user-engagement level of the user at a particular future time point in response to a presentation of future interactive content of the targeted campaign, wherein the particular future time point is defined by a preconfigured duration of time elapsed from a time when a particular user-device action is performed in response to the interactive content of the targeted campaign, wherein the machine-learning model was trained using a training dataset including previous user-device actions performed by a plurality of users in response to previous interactive content associated with other campaigns, and wherein the machine-learning model was trained at least by:

identifying a time period within which the previous user-device actions were performed;

splitting the time period into a set of time windows; and training, for a subset of time windows of the set of time windows, the machine-learning model using a subset of the training dataset corresponding to a time window of the subset of time windows, wherein the subset of the training dataset includes previous user-device actions performed by at least one of the plurality of users and identified as being performed within the time window, wherein a duration of the time window is adjustable based on user-device actions in a corresponding subset of training dataset during training, wherein training the machine-learning model comprises creating a target label representing a known user-engagement level of a user associated with the subset of training dataset; and selecting, based on the categorical value, a particular follow-up interactive content from a set of follow-up interactive content, wherein resources allocated for generating the particular follow-up interactive content are determined in accordance with the outputted categorical value.

16. The computer program product of claim 15, wherein the training dataset includes a plurality of training data elements, wherein each of the plurality of training data elements identifies: (i) information associated with a previous user; (ii) a type of previous interactive content; (iii) a previous user-device action performed in response to presentation of the previous interactive content; and (iv) a time stamp identifying when the previous user-device action was performed.

17. The computer program product of claim 15, wherein the machine-learning model was validated using a validation data set that includes a subset of previous user-device actions performed during a last time window of the set of time windows.

18. The computer program product of claim 15, wherein the machine-learning model is a gradient boosting algorithm.

19. The computer program product of claim 15, wherein the output further includes a quantitative value that estimates a degree of the predicted user-engagement level of the user.

* * * * *